April 7, 1931.  J. G. PEW  1,799,761
INTERNAL COMBUSTION ENGINE
Filed Aug. 24, 1925
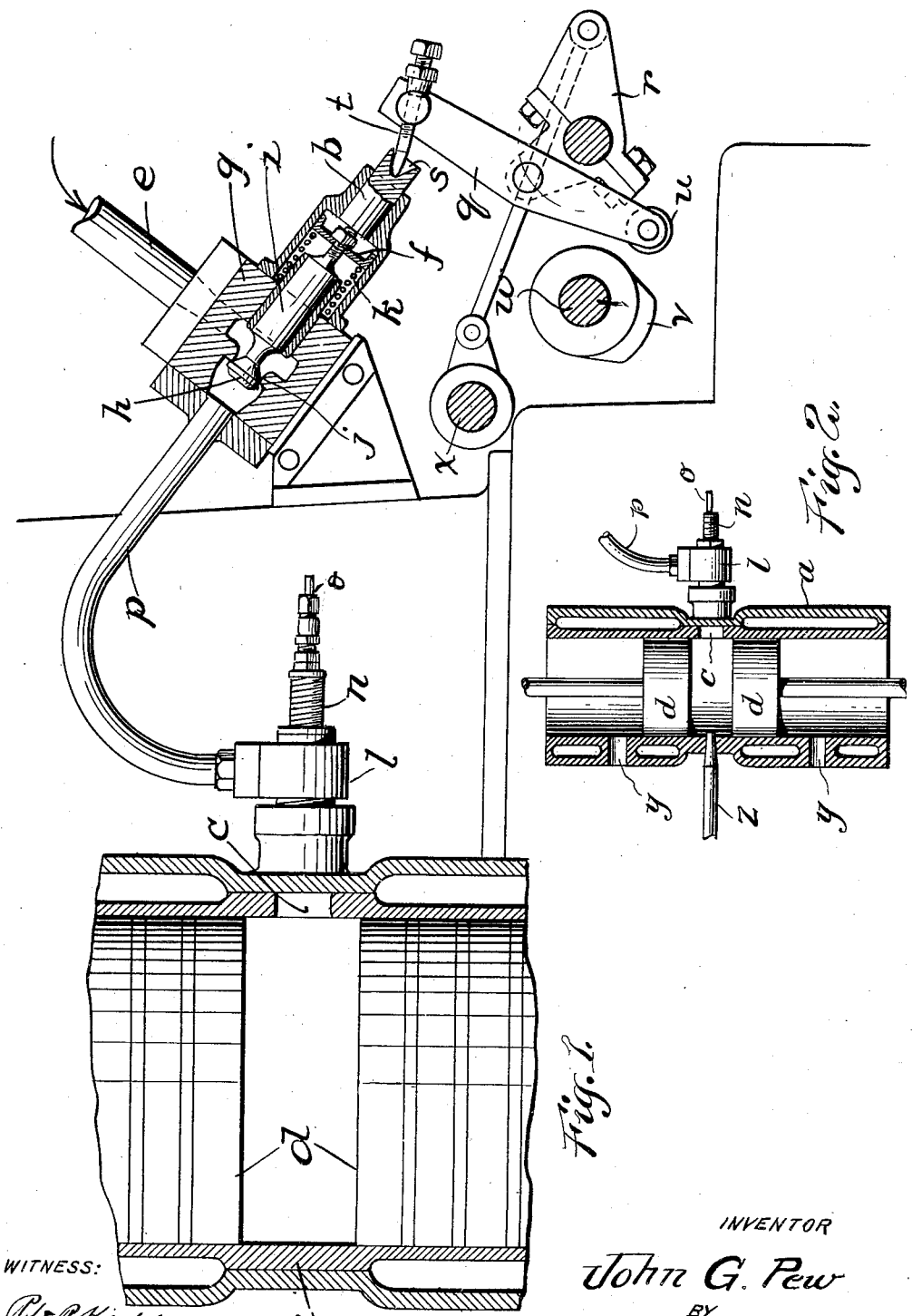
INVENTOR
John G. Pew
BY
Bruce + Harding
ATTORNEYS.

Patented Apr. 7, 1931

1,799,761

UNITED STATES PATENT OFFICE

JOHN G. PEW, OF MEDIA, PENNSYLVANIA, ASSIGNOR TO SUN SHIPBUILDING AND DRY DOCK COMPANY, A CORPORATION OF PENNSYLVANIA

INTERNAL-COMBUSTION ENGINE

Application filed August 24, 1925. Serial No. 51,913.

My invention relates to an improvement in internal combustion engines. Internal combustion engines, as is well known, depend for their operation upon the expansion of the fuel, which is accomplished by burning it and is accompanied, during the power stroke of the engine, by temperatures of very high degree. In order to practically utilize the power developed by the expansion of the fuel, it is necessary to provide means for the cooling of such engines and to this end it is customary to jacket the cylinders and absorb the excess heat by means of water circulated through the jackets, the absorbed heat being wasted.

Through the necessity for cooling internal combustion engines, a substantial amount of power is lost, and the possible maximum efficiency of such engines reduced by from thirty to forty per cent.

Further, in such engines, it is necessary, in order to fully exhaust the burnt gases, that the exhaust be opened before the pressure within the cylinder becomes too low, which results in exhausting of the burnt gases while they are still at a relatively high temperature and with consequent waste of heat and loss of efficiency.

Now it is the object of my invention to provide a method and means for its accomplishment, whereby the high temperature incident to the burning of the fuel may be reduced and whereby it may be reduced in a manner and by a medium which will itself afford, on the absorption of heat, a degree of power which will be utilized instead of wasted, as heretofore.

Further objects of my invention are to provide a method and means for increasing the efficiency and economy of such engines.

Having now indicated, in a general way, the nature and purpose of my invention, I will proceed to a detailed description thereof, with reference to the accompanying drawings, in which I have illustrated a preferred embodiment of my invention, and in which:

Figure 1 is a diagrammatic illustration of an engine cylinder and apparatus embodying my invention.

Figure 2 is a diagram of the cylinder shown in Figure 1 in more detail.

In the drawing, $a$ represents a cylinder of an internal combustion engine of, for example, an opposed piston Diesel type, provided with a port $c$ at about the middle of the cylinder and with exhaust ports $y$. $d$ indicates a pair of opposed pistons within the cylinder $a$, shown in substantially upper dead center position and $z$ indicates a fuel injection nozzle.

$e$ indicates a pipe or conduit connected to a main air storage tank and to the casing $g$ of a valve $h$, provided with a stem $i$. Extending through the casing is a tappet $b$ engaging the end of stem $i$ and having a tapered cavity $s$ in its free end. Valve $h$ is adapted to be held on its seat $j$ by means of a spring $k$, which bears on a yoke $f$ adjustably secured to the stem $i$.

Associated with the port $c$ is a casing $l$ within which is a non-return or check valve yieldingly closed by means of a spring $n$ embracing its stem $o$. A pipe or conduit $p$ affords a passage between the valve casing $g$ and casing $l$.

Suitably located adjacent the valve $h$ is a rocker arm $q$ pivotally mounted on one arm of a pivoted bell crank lever $r$. One end of the rocker arm is equipped with an adjustable push rod $t$, one end of which extends into the tapered cavity $s$ in tappet $b$ and engages with the tappet. The other end of the rocker arm is equipped with a roller $u$ adapted to be acted on for the opening of valve $h$ through actuation of the rocker arm by a cam $v$ on a cam shaft $w$ operated through suitable gearing from the main shaft of the engine.

A maneuvering shaft $x$, which may be rotated by any convenient means and which is connected to an arm of the bell crank $r$, through the medium of an arm 2, secured to the shaft, and a link 3 is provided for varying the timing of contact of cam $v$ with roller $u$ and hence the time of the opening of valve $h$; it being clear that if the bell crank lever $r$ is turned on its pivot through manipulation of the maneuvering shaft, to which it is connected, the position of the roller relative to the cam will be changed, the movement being permitted by the taper of the walls of the cavity in the tappet in which the end of push rod $t$ is positioned.

In the operation of the device illustrated and described, it is the purpose of my invention to introduce air into the engine cylinder during the expansion or power stroke, at a time preferably after the fuel has been consumed and before the exhaust opens. I have found that results of a satisfactory nature are obtained if the air be introduced when the piston has reached a point, say, for example, from twenty to thirty degrees after upper dead center. The air thus introduced immediately absorbs heat from the products of combustion in the cylinder and from the walls of the cylinder, thus cooling the products of combustion and the cylinder walls. The heat thus absorbed by the air expands it and it exerts a driving pressure on the piston. Thus, the heat of combustion of the fuel which heretofore has been absorbed into external cooling water and wasted, or wasted through the exhaust, is, by virtue of my invention, absorbed by the air introduced into the interior of the cylinders, and the heat through the expansion of the air, by which it is absorbed, is utilized for the production of power. As will be readily appreciated, the utilization, as described, of the excess heat, instead of wasting it as heretofore, results in increasing the power and efficiency of the engine.

In practice, the apparatus illustrated operates for the introduction of air to the cylinder $a$. Air at sufficient is provided and cam $v$ is turned so that when the engine is operated valve $h$ will be opened by rocker arm $q$ when the piston has reached the desired point below upper dead center. The maneuvering shaft enables the time of the opening of the valve to be varied during operation of the engine with desirable limits, for example from 20°–30° after upper dead center.

The air entering the cylinder serves to cool the products of combustion and the cylinder walls and is itself expanded, in relation to the heat absorbed, and furnishes power. The introduction of the air normally cools the cylinder, but allows for cooling of the gases to a much lower temperature than heretofore before they are exhausted, with the result that a saving of heat heretofore wasted through the exhaust is effected, as well as a saving of heat heretofore wasted through a cooling medium.

Having now fully described my invention, what I claim and desire to protect by Letters Patent is:

1. The method of operating an internal combustion engine having a cylinder provided with an exhaust port and a piston, which comprises introducing fuel into the cylinder, igniting the fuel, and introducing air into the cylinder only when the piston has reached a position between 20° and 40° after its upper dead center position.

2. The method of operating an internal combustion engine having a cylinder provided with an exhaust port and a piston, which comprises introducing fuel into the cylinder, igniting the fuel, and introducing relatively cold air into the cylinder only when the piston has reached a position approximately 30° after its upper dead center position.

3. In an internal combustion engine, in combination, a cylinder provided with an exhaust port, a fuel inlet, and an air inlet, a piston arranged to reciprocate within the cylinder, a conduit communicating with the air inlet and adapted to lead air under pressure into the cylinder, a valve controlling said conduit and operable only when the piston reaches a position during the power stroke between 20° and 40° after inner dead center to permit the passage of compressed air into the cylinder, and a check valve located in the conduit between the cylinder and the controlling valve and arranged to permit the passage of gas to the cylinder but to prevent passage of gas therefrom.

4. In an internal combustion engine, in combination, a cylinder provided with an exhaust port, a fuel inlet, and an air inlet, a piston arranged to reciprocate within the cylinder, and means for introducing compressed air into the cylinder through the air inlet, said means being automatically operated only when the piston reaches a position during the power stroke between 20° and 40° after inner dead center.

5. In an internal combustion engine, in combination, a cylinder provided with an exhaust port, a fuel inlet, and an air inlet, a piston arranged to reciprocate within the cylinder, and means for introducing compressed air into the cylinder through the air inlet, said means being automatically operated when the piston reaches a position during the power stroke approximately 30° after inner dead center.

In testimony of which invention, I have hereunto set my hand, at Chester, Pennsylvania, on this 5th day of August, 1925.

JOHN G. PEW.